(12) United States Patent
Yamamoto et al.

(10) Patent No.: US 12,246,746 B2
(45) Date of Patent: Mar. 11, 2025

(54) OPERATION SYSTEM AND OPERATION SYSTEM CONTROL METHOD

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 275 days.

(21) Appl. No.: 18/020,268

(22) PCT Filed: Aug. 5, 2021

(86) PCT No.: PCT/JP2021/029093
§ 371 (c)(1),
(2) Date: Feb. 8, 2023

(87) PCT Pub. No.: WO2022/034849
PCT Pub. Date: Feb. 17, 2022

(65) Prior Publication Data
US 2023/0271630 A1    Aug. 31, 2023

(30) Foreign Application Priority Data
Aug. 8, 2020  (JP) ................. 2020-135444

(51) Int. Cl.
*B60W 60/00* (2020.01)
*B60W 30/12* (2020.01)

(52) U.S. Cl.
CPC .......... *B60W 60/001* (2020.02); *B60W 30/12* (2013.01); *B60W 2300/10* (2013.01); *B60W 2552/53* (2020.02)

(58) Field of Classification Search
None
See application file for complete search history.

(56) References Cited

U.S. PATENT DOCUMENTS 4,361,202 A    11/1982 Minovitch
5,000,279 A *   3/1991 Kondo .................... B62D 1/28
                                                318/587

(Continued)

FOREIGN PATENT DOCUMENTS

CN    102787538 A    11/2012
CN    103850204 A     6/2014

(Continued)

OTHER PUBLICATIONS

International Search Report and Written Opinion mailed on Sep. 14, 2021, received for PCT Application PCT/JP2021/029093, filed on Aug. 5, 2021, 9 pages including English Translation.

*Primary Examiner* — Daniel L Greene
*Assistant Examiner* — Robert L Pinkerton
(74) *Attorney, Agent, or Firm* — XSENSUS LLP

(57) ABSTRACT

In an operation system (1) for a bus (5) including a connection point database which stores identification information of a magnetic marker (10) positioned so as to correspond to a connection point (13) between a dedicated lane (111) having magnetic markers (10) laid thereon and a general lane (112), the connection point (13) is set so as to correspond to the magnetic marker (10) according to identification information stored in a connection point database, thereby allowing flexibility in changing a route to be improved in the operation system which causes a vehicle to operate along a route defined in advance.

14 Claims, 17 Drawing Sheets

(56) References Cited

U.S. PATENT DOCUMENTS

| | | | | |
|---|---|---|---|---|
| 2015/0294566 A1* | 10/2015 | Huang | .................. | G08G 1/127 |
| | | | | 701/41 |
| 2015/0339920 A1* | 11/2015 | Cortelyou | .............. | G06V 20/52 |
| | | | | 340/907 |
| 2017/0103265 A1* | 4/2017 | Channah | .................. | G07C 9/37 |
| 2019/0155305 A1 | 5/2019 | Yamamoto et al. | | |
| 2019/0194886 A1 | 6/2019 | Yamamoto et al. | | |
| 2020/0284586 A1* | 9/2020 | Yamamoto | ............. | G08G 1/163 |
| 2020/0354907 A1 | 11/2020 | Yamamoto et al. | | |
| 2021/0062567 A1* | 3/2021 | Majdali | .................... | B61B 1/02 |

FOREIGN PATENT DOCUMENTS

| | | |
|---|---|---|
| DE | 10 2016 010414 A1 | 3/2018 |
| JP | 2000-259987 A | 9/2000 |
| JP | 2000-264196 A | 9/2000 |
| JP | 2010-97253 A | 4/2010 |
| WO | 2017/187879 A1 | 11/2017 |
| WO | 2017/217423 A1 | 12/2017 |

* cited by examiner

OPERATION SYSTEM AND OPERATION SYSTEM CONTROL METHOD

CROSS-REFERENCE TO RELATED APPLICATIONS

The present application is based on PCT filing PCT/JP2021/029093, filed Aug. 5, 2021, which claims priority to JP 2020-135444, filed Aug. 8, 2020, the entire contents of each are incorporated herein by reference.

TECHNICAL FIELD

The present invention relates to an operation system which causes a vehicle to operate along a route defined in advance, and a control method therefor.

BACKGROUND ART

Conventionally, a vehicle operation system which causes a bus to operate along a route defined in advance has been known (for example, refer to Patent Literature 1). The vehicle operation system is inexpensive in infrastructure, has high flexibility in route setting, and so forth, compared with railroads. In particular, a vehicle operation system where a vehicle autonomously travels is expected to be used as means of transportation for elderly people in sparsely-populated areas where aging has proceeded.

As a vehicle operation system where a vehicle autonomously travels, a system has been suggested in which a vehicle is caused to automatically travel along magnetic markers arrayed along a route. The system using magnetic markers relatively easily ensures robustness against environmental disturbance such as rain, snow, and direct sunlight, compared with a system which performs image recognition of a lane (vehicle's traveling area).

CITATION LIST

Patent Literature

Patent Literature 1: Japanese Unexamined Patent Application Publication No. 2010-97253

SUMMARY OF INVENTION

Technical Problem

In the conventional vehicle operation system, there is a problem in which a route change such as setting and canceling a branching point and/or a merging point is not easy.

The present invention was made in view of the above-described conventional problem, and is an invention to provide a vehicle operation system which causes a vehicle to operate along a route defined in advance, the system having improved flexibility in changing the route.

Solution to Problem

One mode of the present invention resides in a operation system for causing a vehicle to automatically travel along a dedicated lane for vehicles, the system having
  a plurality of magnetic markers arranged in the dedicated lane;
  a storage part which stores, as connection point identification information, identification information of a magnetic marker corresponding to a connection point for at least either one of branching from the dedicated lane to another lane and merging from another lane to the dedicated lane; and
  a setting part which sets or cancels the connection point, wherein
  the storage part is configured to store, as the connection point identification information, identification information of the magnetic marker corresponding to the connection point when the connection point is set by the setting part, and erase the connection point identification information according to identification information of the magnetic marker corresponding to the connection point when the connection point is canceled by the setting part, and
  the system is configured so that at least one of branching from the dedicated lane to another lane and merging from another lane to the dedicated lane is allowed at a point corresponding to the magnetic marker according to the connection point identification information stored in the storage part.

One mode of the present invention resides in a method of controlling an operation system for causing a vehicle to automatically travel along a dedicated lane for vehicles, the operation system having:
  a plurality of magnetic markers arranged in the dedicated lane;
  a storage part which stores, as connection point identification information, identification information of a magnetic marker corresponding to a connection point for at least either one of branching from the dedicated lane to another lane and merging from another lane to the dedicated lane; and
  a setting part which sets or cancels the connection point, wherein
  the storage part is configured to store, as the connection point identification information, identification information of the magnetic marker corresponding to the connection point when the connection point is set by the setting part, and erase the connection point identification information according to identification information of the magnetic marker corresponding to the connection point when the connection point is canceled by the setting part, and
  at least one of branching from the dedicated lane to another lane and merging from another lane to the dedicated lane is allowed at a point corresponding to the magnetic marker according to the connection point identification information stored in the storage part.

Advantageous Effects of Invention

The operation system according to the present invention is a system for causing a vehicle to automatically travel along a dedicated lane where a plurality of magnetic markers are arranged. This operation system stores identification information of a magnetic marker corresponding to a connection point between the dedicated lane and another lane as the connection point identification information. Also, in this operation system, at a point corresponding to a magnetic marker according to the connection point identification information stored, at least one of branching from the dedicated lane to another lane and merging from another lane to the dedicated lane is allowed.

In the operation system according to the present invention, by storing or erasing the connection point identification information, the connection point between the dedicated lane and the other lane can be set or canceled, and a route change is relatively easy. Using the operation system and control method of the present invention, an operation system with excellent characteristics with improved flexibility in changing a route can be achieved.

DESCRIPTION OF EMBODIMENTS

Figure 1:
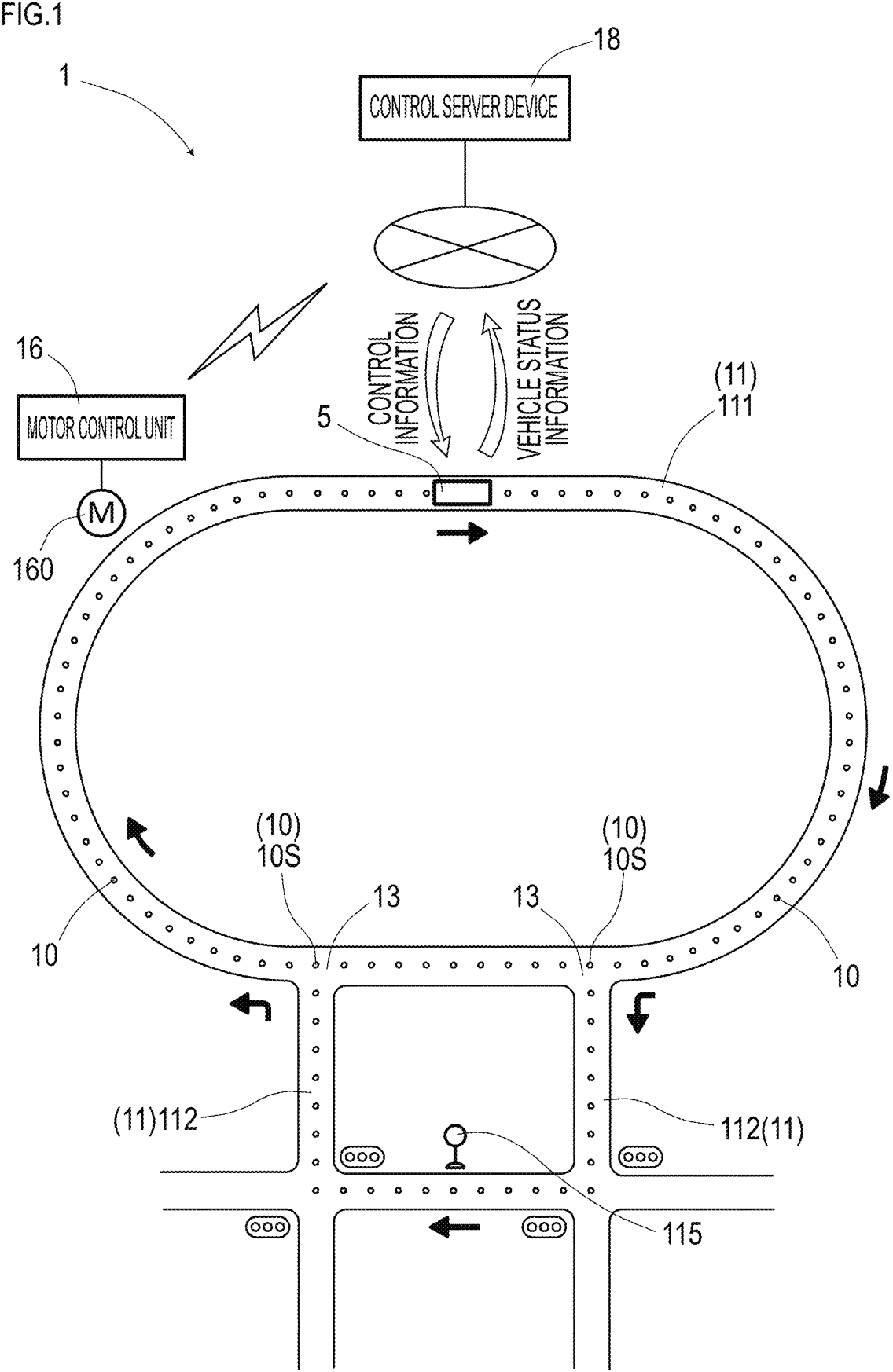
FIG. 1 is a first system diagram depicting the configuration of an operation system.

Embodiments of the present invention are specifically described by using the following embodiments.

First Embodiment

The present embodiment is an example regarding operation system 1 of bus (one example of a vehicle) 5. This operation system 1 is a system where bus 5 automatically travels traveling lane 11 where magnetic markers 10 are laid. Details of this are described with reference to FIG. 1 to FIG. 17.

Traveling lane 11 (FIG. 1) has dedicated lane 111 for bus 5, as well as general lane 112 leading to stop 115 which allows users to get on or off. On dedicated lane 111, connection point 13 to general lane 112, which is one example of another lane, can be set. By using connection point 13, bus 5 can branch from dedicated lane 111 to general lane 112 or can merge from general lane 112 into dedicated lane 111.

Operation system 1 (FIG. 1) is configured to include control server device 18 which performs remote control of traveling of bus 5, and bus 5 communicable with control server device 18. Bus 5 detects magnetic marker 10 during traveling, and measures a lateral shift amount of its vehicle body with respect to magnetic marker 10. Control server device 18 uses the lateral shift amount of the vehicle body with respect to magnetic marker 10 to perform remote control of bus 5 so that it travels along magnetic marker 10. In the following, (1) traveling lane, (2) magnetic marker, (3) bus, and (4) control server device are described, and then (5) system operation is described.

(1) Traveling Lane

As described above, traveling lane 11 (FIG. 1) is configured of dedicated lane 111 for bus 5 and general lane 112 where stop 115 is provided. Dedicated lane 111 is a one-way annular circular path. Dedicated lane 111 is partitioned by fences 110 (FIG. 3) on both sides so that people and general vehicles cannot enter. General lane 112 is a lane (vehicle lane) branched from dedicated lane 111 or merging into dedicated lane 111. After branching from dedicated lane 111, bus 5 can travel general lane 112 to arrive at stop 115. Bus 5 departing from stop 115 can travel general lane 112 to merge into dedicated lane 111.

A major difference between dedicated lane 111 and general lane 112 resides in whether general vehicles other than bus 5 can travel. Because of this difference, the control speed when bus 5 is caused to automatically travel and so forth varies between dedicated lane 111 and general lane 112. While the control speed is on the order of 40 km to 50 km per hour in dedicated lane 111, the control speed is reduced in general lane 112 to be on the order of 0 km to 20 km per hour.

Fences 110 (FIG. 3 and FIG. 4) for partitioning dedicated lane 111 are configured of movable fences 110A of a movable type and fixed fences 110B of a fixed type. In operation system 1, connection point 13 of dedicated lane 111 to general lane 112 can be set by movement of any movable fence 110A. Movable fences 110A are each provided so as to correspond to a specific point that can be set as connection point 13 of general lane 112 with respect to dedicated lane 111, such as a branching point from dedicated lane 111 to general lane 112 or a merging point from general lane 112 to dedicated lane 111.

Movable fence 110A has a configuration similar to that of a platform door installed in a platform of a train station. Movable fence 110A is provided with drive motor 160 controlled by motor control unit 16. Motor control unit 16 can communicate with control server device 18 via the Internet. Motor control unit 16 causes drive motor 160 to be rotationally driven in response to a control signal from control server device 18.

Figure 4:
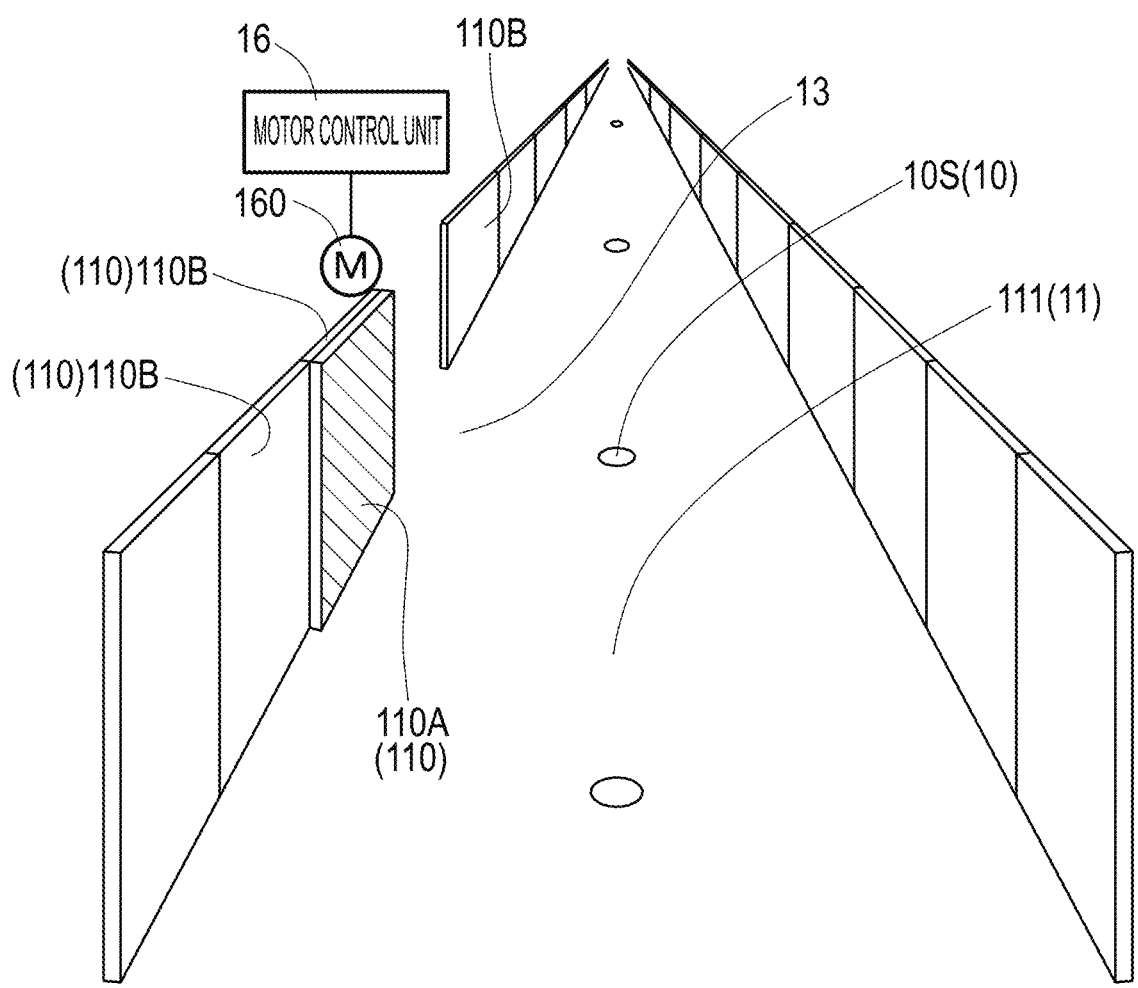
FIG. 4 is a descriptive diagram depicting the dedicated lane where a connection point is set.

Movable fence 110A moves along a lane direction by driving force of drive motor 160 to be displaced to a position overlapping adjacent fixed fence 110B (refer to FIG. 4). In this manner, the position where movable fence 110A overlaps fixed fence 110B is an open position where dedicated lane 111 is open to general lane 112. On the other hand, a position where movable fence 110A is located between adjacent fixed fences 110B is a closed position where dedicated lane 111 is closed to general lane 112 (refer to FIG. 3). When movable fence 110A is at the open position, connection point 13 of dedicated lane 111 with respect to general lane 112 is provided. This allows cross-access between dedicated lane 111 and general lane 112. On the other hand, when movable fence 110A is at the closed position, accessing from general lane 112 to dedicated lane 111 and branching from dedicated lane 111 to general lane 112 are disabled.

In operation system 1 of the present embodiment, magnetic markers 10 individually corresponding to respective movable fences 110A are defined in advance. In operation system 1, the open/closed state of movable fence 110A can be switched depending on whether identification information of magnetic marker 10 (specific marker 10S) positioned so as to correspond to movable fence 110A is stored on a system side as identification information of the connection point. Also, by opening or closing movable fence 110A, setting of connection point 13 of dedicated lane 111 with respect to general lane 112 can be changed.

General lane 112 for a forward path from dedicated lane 111 toward stop 115 and general lane 112 for a return path from stop 115 toward dedicated lane 111 may be the same or different. When general lane 112 for a forward path and general lane 112 for a return path are different, connection point 13 to dedicated lane 111 may be different. Also, the connection point 13 may be a point shared for use in branching and merging, or may be a point only for use in branching or merging.

(2) Magnetic Marker

Figure 2:
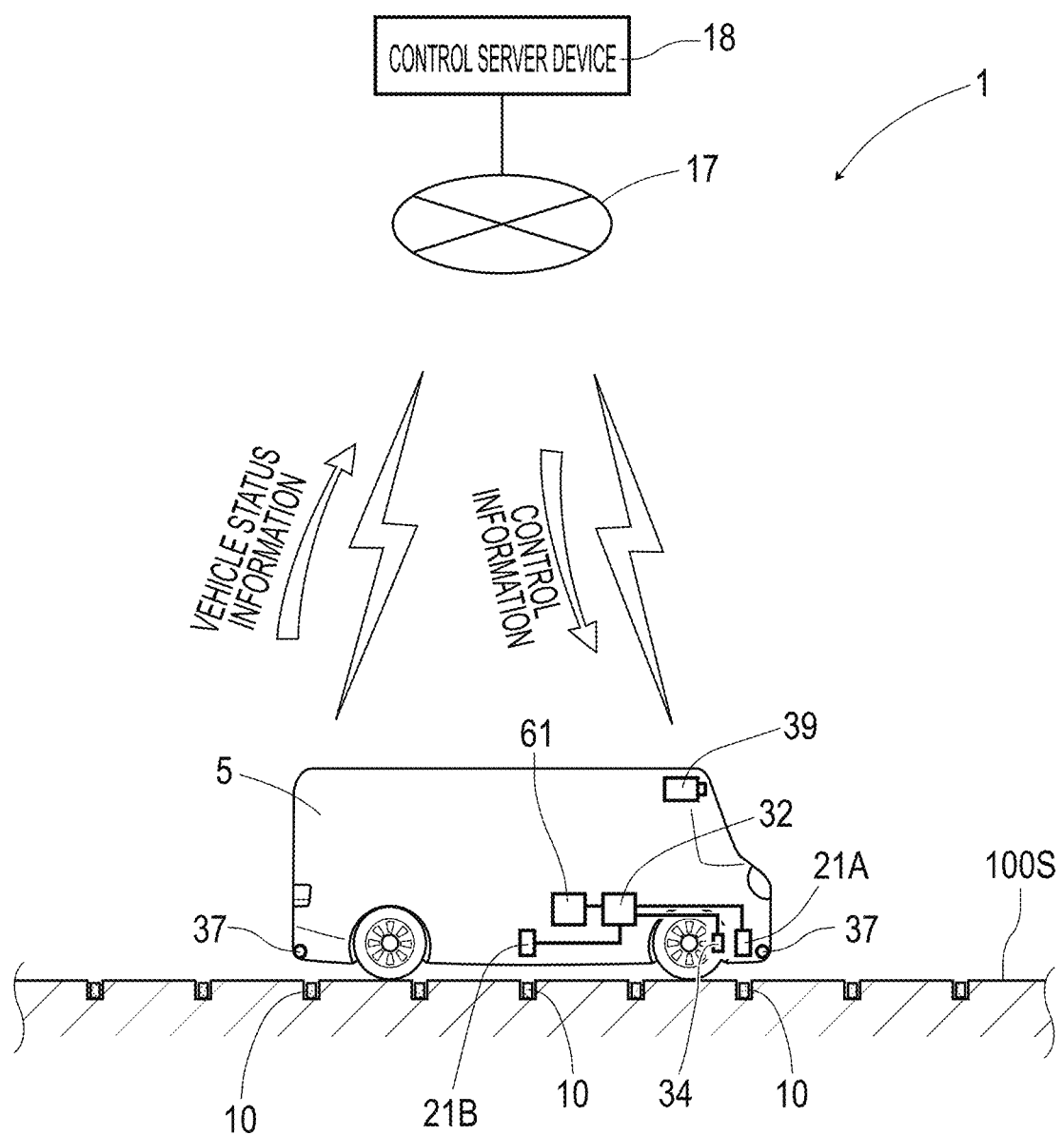
FIG. 2 is a second system diagram depicting the configuration of the operation system.
Figure 3:
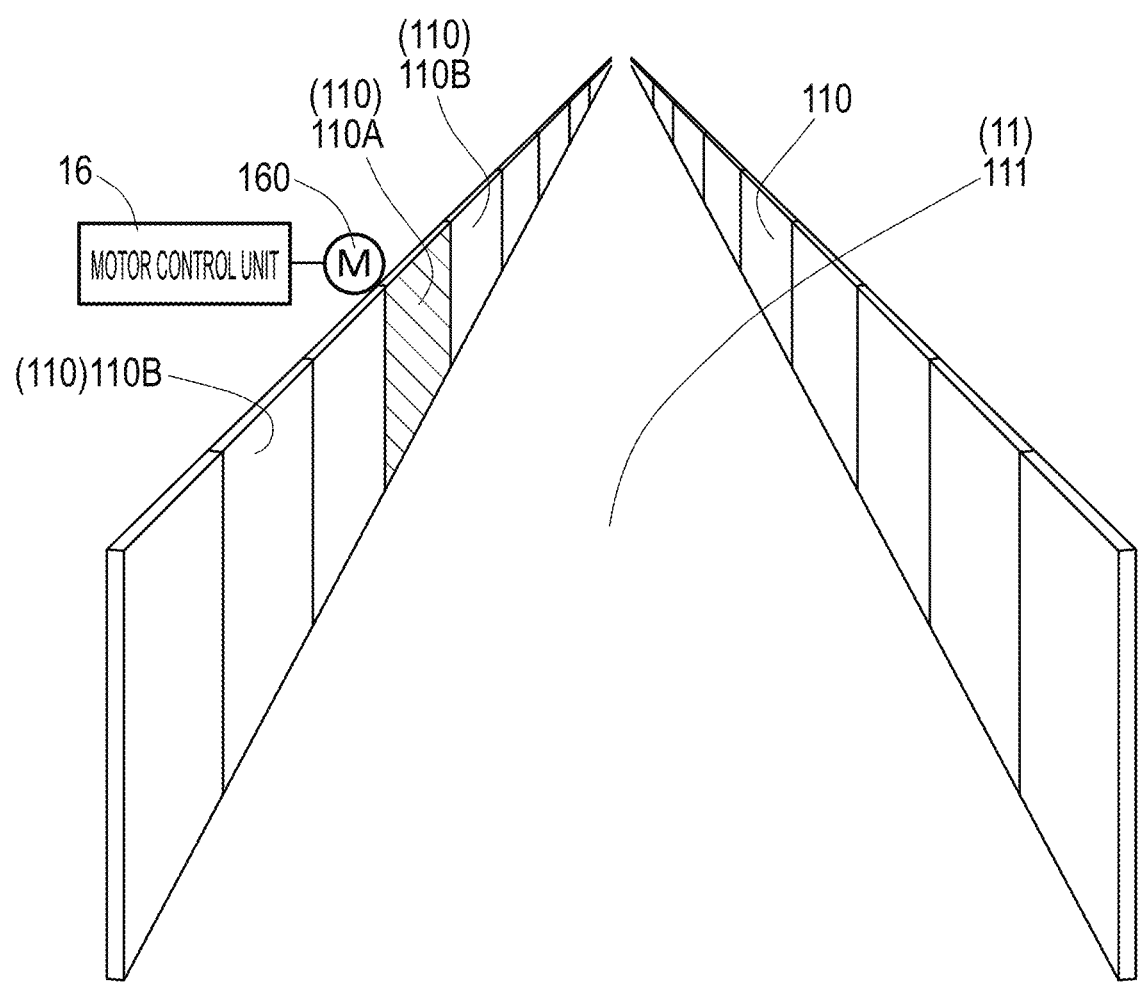
FIG. 3 is a descriptive diagram depicting a dedicated lane.

Magnetic marker 10 (FIG. 2 and FIG. 5) is a marker with RFID tag 15 (Radio Frequency Identification Tag, wireless tag) integrated with a magnet forming a column having a diameter of 20 mm and a height of 28 mm. Magnetic marker 10 is laid in a state of being accommodated in a hole provided on a road surface 100S (FIG. 2). The magnet forming magnetic marker 10 is a ferrite plastic magnet having magnetic powder of iron oxide as a magnetic material dispersed into a polymer material as a base material. This magnet has a maximum energy product (BHmax) of 6.4 kJ/m$^3$. Magnetic marker 10 acts magnetism with magnetic flux density exceeding 8 µT (microtesla) at a height of 250 mm as an attachment height of magnetic sensor arrays 21A/B (refer to FIG. 2).

Figure 5:
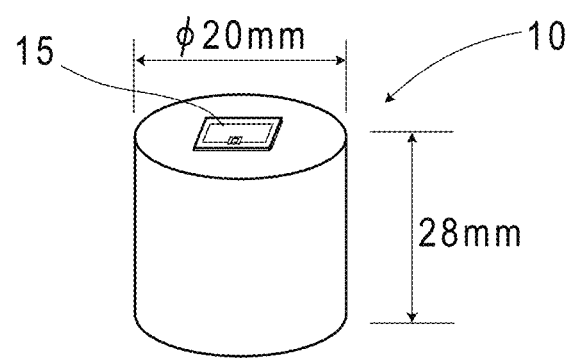
FIG. 5 is a perspective diagram depicting a magnetic marker.
Figure 6:
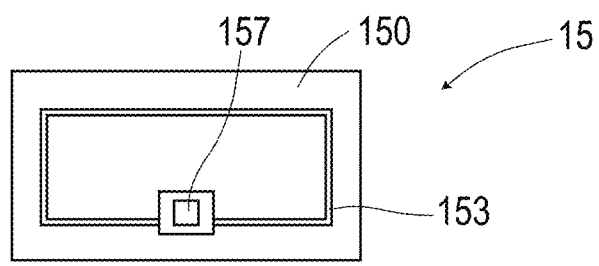
FIG. 6 is a front view of an RFID tag.

In magnetic marker 10, as in FIG. 5, RFID tag 15 which wirelessly outputs tag information is disposed on an end face of the columnar magnet. After sheet-shaped RFID tag 15 is arranged on the end face of the magnet, a coating layer made of a resin material may be provided on the surface. As the coating layer, a layer formed of a composite material with fiber impregnated with a resin material may be used. Alternatively, sheet-shaped RFID tag 15 may be disposed on the end face of the magnet where the coating layer is formed. The coating layer may be provided on the entire or a part of the outer surfaces of the magnet except the end surface where RFID tag 15 is arranged.

RFID tag 15 (FIG. 6) is an electronic component having IC chip 157 implemented on a surface of tag sheet 150 cut out from, for example, a PET (Polyethylene terephthalate) film. On the surface of tag sheet 150, a printed pattern of antenna 153 is provided. Antenna 153 has both a power-supply-purpose antenna function of causing exciting current to occur by external electromagnetic induction and a communication-purpose antenna function of wirelessly transmitting information such as position data. RFID tag 15 operates by wireless external power supply to externally output tag information such as a tag ID as identification information. The tag ID to be externally outputted from RFID tag 15 is one example of identification information of magnetic marker 10.

(3) Bus (Vehicle)

Bus 5 (FIG. 2 and FIG. 7) is a vehicle capable of automatic driving by remote control. Bus 5 includes, as a sensor group for achieving automatic driving, magnetic sensor arrays 21A/B which perform detection of any magnetic marker 10 and so forth, tag reader unit 34 which communicates with RFID tag 15, milli wave radars 37, forward camera 39, and so forth. Bus 5 includes, as a configuration for performing traveling control, vehicle onboard ECU (Electronic Control Unit) 61 which controls a steering unit, an engine throttle, a brake actuator, and so forth not depicted.

Milli wave radars 37 are sensors for detecting a three-dimensional target object such as another vehicle, a person, a structure such as a guardrail, a curbstone, or the like. Milli wave radars 37 are arranged at front, rear, left, and right corner portions of the vehicle body so as to be able to monitor the surroundings of bus 5. The detection result of each milli wave radar 37 is inputted to control unit 32.

Forward camera 39 is a camera which takes an image of forward environments. Forward camera 39 is configured to include a processing circuit (omitted in the drawings) which performs image processing. By performing image processing on a taken image, forward camera 39 can detect a road sign, traffic signal, person, bicycle, preceding vehicle, oncoming vehicle, and so forth. The detection result of forward camera 39 is inputted to control unit 32.

Vehicle onboard ECU 61 can perform control of causing bus 5 to automatically travel based on control information (control values) outputted from control server device 18. The control information transmitted from control server device 18 is received by control unit 32, and is transferred to vehicle onboard ECU 61.

(3.1) Magnetic Sensor Arrays

Figure 7:
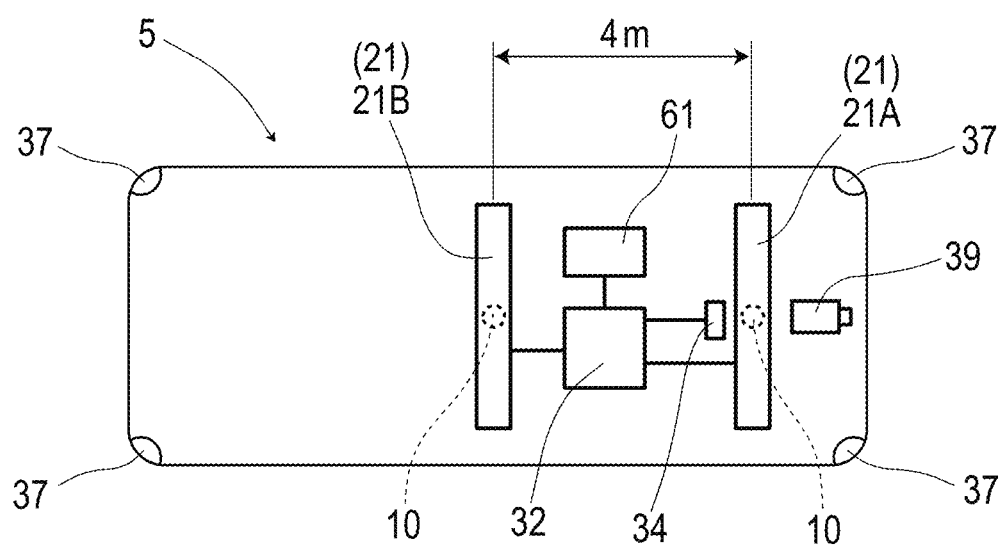
FIG. 7 is an upper view depicting a bus.
Figure 8:
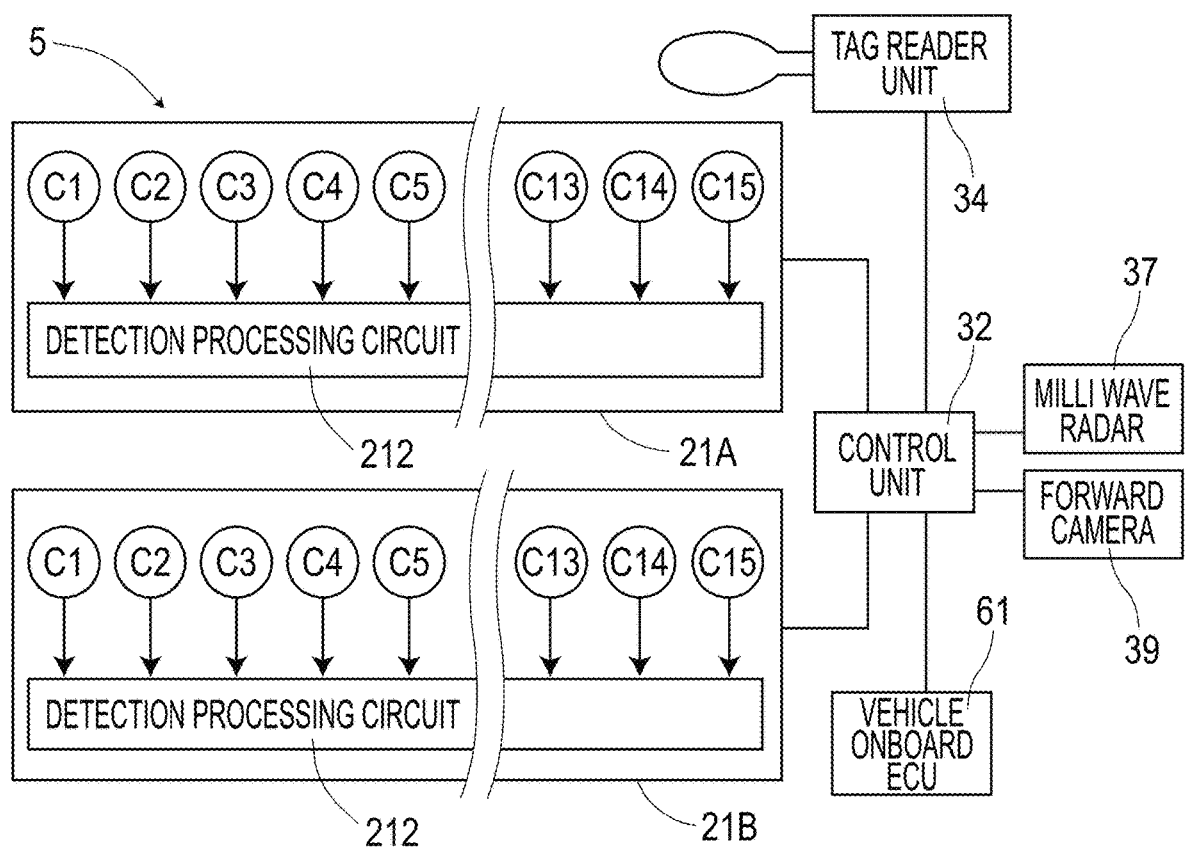
FIG. 8 is a block diagram depicting the electrical configuration of the bus.
Figure 9:
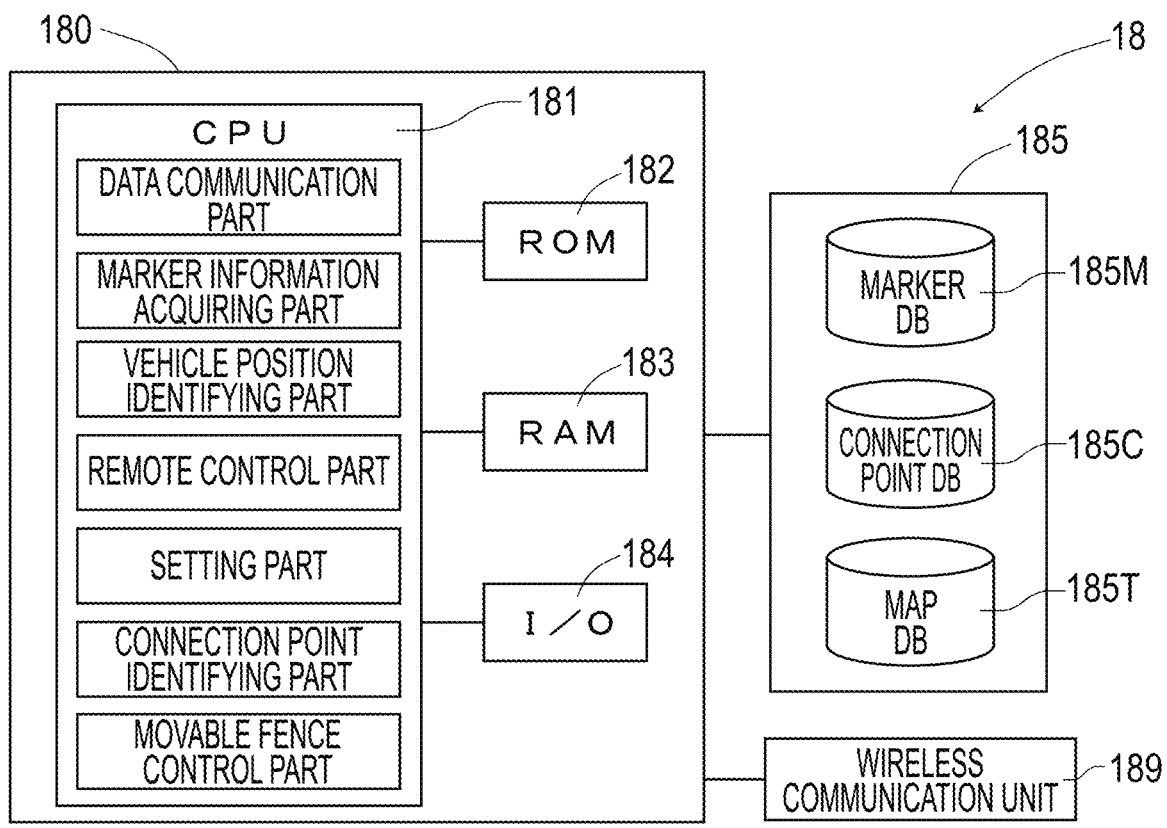
FIG. 9 is a block diagram depicting the configuration of a control server device.
Figure 10:
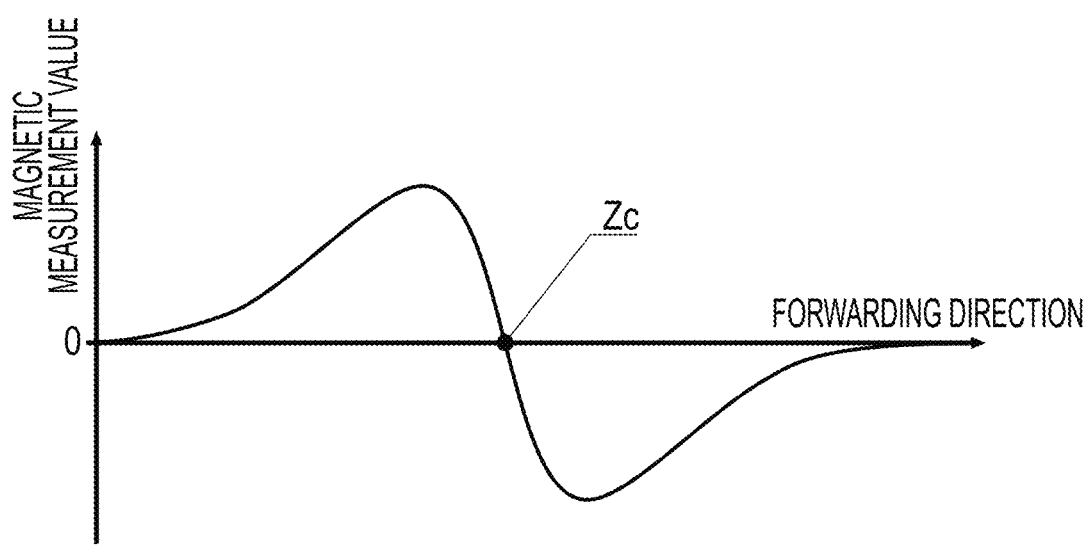
FIG. 10 is a descriptive diagram exemplarily depicting changes of a magnetic measurement value in a traveling direction when a vehicle passes over a magnetic marker.

In bus 5, as in FIG. 7 and FIG. 8, magnetic sensor arrays 21A/B are disposed at two locations four meters apart from each other in a longitudinal direction of bus 5. Magnetic sensor arrays 21A/B, which are one example of a magnetic detecting part, are bar-shaped units elongated in a vehicle-width direction, and are attached onto the bottom surface of bus 5 in a state of facing road surface 100S. By a combination of magnetic sensor array 21A on a front side and magnetic sensor array 21B on a rear side, among magnetic markers 2 arranged along a route with two-meter pitches, two magnetic markers 10 aligned four meters away and interposing one magnetic marker can be simultaneously detected.

Magnetic sensor arrays 21A/B (FIG. 8) each include fifteen magnetic sensors $C_n$ (n is an integer of 1 to 15) arrayed on a straight line along the vehicle-width direction and detection processing circuit 212 having incorporated therein a CPU not depicted and so forth. In each of magnetic sensor arrays 21A/B, fifteen magnetic sensors $C_n$ are arranged equidistantly with ten-centimeter pitches.

Magnetic sensors $C_n$ are sensors which detect magnetism by using the known MI effect (Magneto Impedance Effect) in which the impedance of a magneto-sensitive body such as an amorphous wire sensitively changes in response to the external magnetic field. In magnetic sensors $C_n$, magneto-sensitive bodies are arranged along orthogonal biaxial directions, thereby allowing detection of magnetism acting in orthogonal biaxial directions. In the present embodiment, magnetic sensors $C_n$ are incorporated in magnetic sensor arrays 21A/B so as to be able to detect magnetic components in a forwarding direction and the vehicle-width direction.

Magnetic sensors $C_n$ are highly-sensitive sensors with a measurement range of magnetic flux density of ±0.6 ml and a magnetic flux resolution of 0.02 µT in the measurement range. Here, as described above, magnetic marker 10 can act magnetism with magnetic flux density exceeding 8 µT at the attachment height of magnetic sensors Cn of 250 mm. With magnetic marker 10 acting magnetism with magnetic flux density exceeding 8 µT, detection can be made with high reliability by using magnetic sensors Cn with a magnetic flux resolution of 0.02 µT.

Detection processing circuit 212 (FIG. 8) of each of magnetic sensor arrays 21A/B is an arithmetic circuit which performs marker detection process for detecting any magnetic marker 10, and so forth. This detection processing circuit 212 is configured by using a CPU which performs various arithmetic operations as well as memory elements such as a ROM and RAM, and so forth, which are not depicted.

Detection processing circuit 212 acquires a sensor signal outputted from each of magnetic sensors Cn at a frequency of 3 kHz to perform marker detection process, and then inputs the detection result of the marker detection process to control unit 32. Although details are described further below, in this marker detection process, in addition to detection of magnetic marker 10, measurement of a lateral shift amount (one example of a relative position in a width direction) with respect to magnetic marker 10 is performed. The lateral shift amount with respect to magnetic marker 10 is, for example, a shift amount of the central position (center position) of magnetic sensor array 21 with respect to magnetic marker 10 in the vehicle-width direction. The center position of magnetic sensor array 21 is positioned approximately at the center of bus 5 in the vehicle-width direction. Therefore, the shift amount of the center position of magnetic sensor array 21 with respect to magnetic marker 10 can be handled as a lateral shift amount of bus 5 with respect to magnetic marker 10.

With the lateral shift amount with magnetic marker 10 detected by magnetic sensor array 21A on the front side and the lateral shift amount with magnetic marker 10 detected by magnetic sensor array 21B on the rear side, the orientation of bus 5 with respect to the lane direction can be identified. As will be described further below, this identification of the orientation of bus 5 can be performed by control server device 18 which acquires vehicle status information including the lateral shift amounts by the front and rear magnetic sensor arrays 21A/B (two lateral shift amounts).

(3.2) Tag Reader Unit

Tag reader unit 34 (FIG. 7) is a communication unit which wirelessly communicates with RFID tag 15 retained by magnetic marker 10 (FIG. 5). Tag reader unit 34 wirelessly feeds power required for operation of RFID tag 15 to cause RFID tag 15 to operate, and reads tag ID (tag information) as identification information of RFID tag 15. While magnetic sensor array 21A and tag reader unit 34 are depicted as separately provided in FIG. 7, a unit with these integrated together may be adopted.

(3.3) Control Unit

Control unit 32 (FIG. 7) is a unit which controls magnetic sensor arrays 21A/B, tag reader unit 34, milli wave radar 37, forward camera 39, and so forth and transmits and receives various information and data between control server device 18 (refer to FIG. 1).

Control unit 32 transmits vehicle status information to control server device 18 at a sufficiently fast frequency. To this vehicle status information, a vehicle ID is linked so that bus 5 as a transmission source can be identified on a control server device 18 side. In exchange for transmission of the vehicle status information, control unit 32 acquires control information for automatic traveling from control server device 18. The control information (control values) acquired by control unit 32 is inputted to vehicle onboard ECU 61 and applied to traveling control of bus 5, thereby achieving remote control of bus 5 by control server device 18.

The vehicle status information includes information acquired from the outside of the vehicle and information indicating a traveling state of bus 5. The information acquired from the outside of the vehicle includes the tag ID (tag information) acquired from RFID tag 15 retained in magnetic marker 10, the lateral shift amount with respect to magnetic marker 10, the detection result by milli wave radar 37, the detection result by forward camera 39, and so forth. The information indicating the traveling state of bus 5 includes a vehicle speed, steering angle, yaw rate, and so forth. The lateral shift amount with respect to magnetic marker 10 and the tag ID are included in the above-described vehicle status information only when any magnetic marker 10 is detected.

(4) Control Server Device

Control server device 18 (FIG. 9) is a computer device configured mainly of electronic substrate 180 having implemented thereon electronic components such as CPU (Central Processing Unit) 181, ROM (Read Only Memory) 182, and RAM (Random Access Memory) 183. To electronic substrate 180, storage device (storage medium) 185 such as a hard disk drive, wireless communication unit 189, and so forth are connected via I/O (Input/Output) 184.

In control server device 18, by using the storage area of storage device 185, marker database (marker DB) 185M storing marker information regarding each magnetic marker 10, map database (map DB) 185T storing map data representing a three-dimensional structure of traveling lane 11, and connection point database (connection point DB) 185C storing identification information of magnetic marker 10 positioned so as to correspond to connection point 13 between dedicated lane 111 and general lane 112 as connection point identification information are provided. Also in control server device 18, the position of each movable fence 110A is managed. For example, in the storage area of storage device 185, flag data is stored for each movable fence 110A, representing whether it is at an open position or a closed position. By referring to the flag data, control server device 18 can grasp the state of corresponding movable fence 110A.

To the marker information stored in marker DB 185M, the tag ID (tag information), which is identification information of RFID tag 15 provided is linked (associated). In the configuration of the present embodiment, by referring to marker DB 185M by using the tag ID, it is possible to identify corresponding magnetic marker 10. The marker information includes information representing the laying position, information representing an attribute of that laying position, regulation information such as a speed limit, and so forth. In particular, the marker information of magnetic marker 10 positioned so as to correspond to movable fence 110A includes identification information for identifying movable fence 110A.

The map data stored in map DB 185T is configured of vector data representing the structure of traveling lane 11, surrounding environments, and so forth. In this map data, the laying position of magnetic marker 10 and so forth are mapped on traveling lane 11. For example, when bus 5 detects any magnetic marker 10, a lane shape ahead of bus 5 can be acquired by referring to this map data.

Connection point DB 185C forms one example of a storage part which stores the tag ID, which is identification information of magnetic marker 10 positioned so as to correspond to connection point 13 set by a setting part described further below, as identification information of the connection point. Here, as described above, the tag ID is linked to the marker information stored in marker DB 185M. The marker information of magnetic marker 10 corresponding to movable fence 110A further includes identification information for identifying movable fence 110A. Therefore, based on the tag ID stored in connection point DB 185C as connection point identification information, movable fence 110A forming connection point 13, that is, movable fence 110A as a target controlled to be at an open position, can be identified.

To the tag ID stored in connection point DB 185C as connection point identification information, attribute information of connection point 13 is linked. There are two types of attribution information, branching and merging. The attribution information of branching represents that connection point 13 is for a branch from dedicated lane 111 to general lane 112. The attribute information of merging represents that connection point 13 is for a merge from general lane 112 to dedicated lane 111.

With CPU 181 executing programs read from ROM 182, control server device 18 achieves functions as the following respective configurations.

(4.1) Data communication part: The data communication part performs data communication with bus 5, motor control unit 16, and so forth.

(4.2) Marker information acquiring part: When vehicle status information including tag information (tag ID) is received from a bus 5 side, the marker information acquiring part refers to marker DB 185M by using the tag ID to acquire marker information regarding corresponding magnetic marker 10.

(4.3) Vehicle position identifying part (Position identifying part): The vehicle position identifying part identifies the vehicle position where bus 5 is located and the orientation (azimuth) of bus 5.

(4.4) Remote control part: The remote control part remotely controls bus 5 so that it can move along traveling lane 11. The remote control part calculates control values such as a target steering angle and target vehicle speed by arithmetic processing taking vehicle status information including the vehicle speed, steering angle, tag ID, and so forth of bus 5 as input values, and returns the control values as control information. The target speed has a control value including speed zero, that is, stop control.

(4.5) Setting part: The setting part sets or cancels connection point 13 between dedicated lane 111 and general lane 112. As described above, when connection point 13 is set by setting part, the tag ID as identification information of magnetic marker 10 positioned so as to correspond to that connection point 13 is stored in connection point DB 185C as connection point identification information.

(4.6) Connection point identifying part: Based on the tag ID stored in connection point DB 185C as connection point identification information, movable fence 110A corresponding to connection point 13 is identified.

(4.7) Movable fence control part: The movable fence control part forming one example of a control part remotely controls opening/closing of movable fence 110A. In operation system 1 of the present embodiment, connection point 13 between dedicated lane 111 and general lane 112 is set/canceled in accordance with opening/closing of movable fence 110A.

(5) System Operation

Next, (5.1) marker detection process, (5.2) automatic traveling control, (5.3) connection point control in operation system 1 as described above are sequentially described.

(5.1) Marker Detection Process

The marker detection process is a process to be performed by magnetic sensor arrays 21A/B (refer to FIG. 8). Magnetic sensor arrays 21A/B performs the marker detection process by using magnetic sensors Cn at a frequency of 3 kHz.

As described above, magnetic sensors Cn are configured to measure magnetic components in the forwarding direction and the vehicle-width direction of bus 5. For example, when these magnetic sensors Cn move in the forward direction and pass over directly above any magnetic marker 10, the sign of a magnetic measurement value in the forwarding direction is reversed before and after magnetic marker 10 as in FIG. 10, and the value changes so as to cross zero at a position directly above magnetic marker 10. Therefore, during traveling of bus 5, when zero-cross Zc occurs where the sign of magnetism in the forwarding direction detected by any magnetic sensor Cn is reversed, it can be determined that magnetic sensor arrays 21A/B are positioned directly above magnetic marker 10. Detection processing circuit 212 determines that magnetic marker 10 is detected when magnetic sensor arrays 21A/B are positioned directly above magnetic marker 10 and zero-cross Zc of the magnetic measurement value in the forwarding direction occurs.

Figure 11:
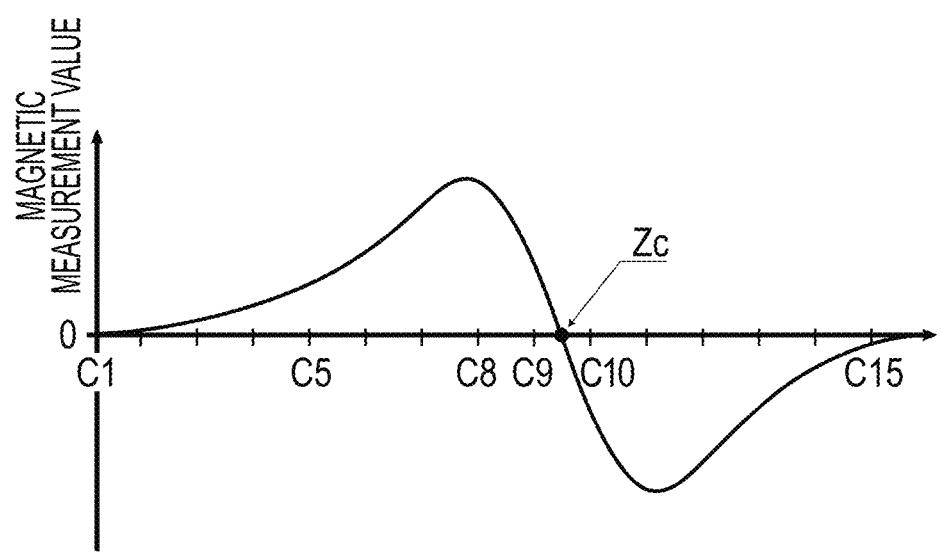
FIG. 11 is a descriptive diagram exemplarily depicting a distribution of magnetic measurement values in a vehicle-width direction by magnetic sensors Cn arrayed in the vehicle-width direction.

Also, for example, as for magnetic sensors with specifications same as those of magnetic sensors Cn, when movement along a virtual line in the vehicle-width direction passing over directly above magnetic marker 10 is assumed, the sign of the magnetic measurement value in the vehicle-width direction is reversed on both sides of magnetic marker 11, and the value changes so as to cross zero at a position directly above magnetic marker 10. In magnetic sensor arrays 21A/B having fifteen magnetic sensors Cn arrayed in the vehicle-width direction, the sign of magnetism in the vehicle-width direction to be detected by magnetic sensor Cn differs depending on which side the magnetic sensor is present with respect to magnetic marker 10 (FIG. 11).

Based on a distribution of FIG. 11 exemplarily depicting magnetic measurement values in the vehicle-width direction of each magnetic sensor Cn belonging to magnetic sensor arrays 21A/B, an intermediate position between adjacent two magnetic sensors Cn across zero-cross Zc where the sign of magnetism in the vehicle-width direction is reversed or a position directly below magnetic sensor Cn where magnetism in the vehicle-width direction to be detected is zero and with the signs of magnetic sensors Cn on both outer sides being reversed is a position of magnetic marker 10 in the vehicle-width direction. Detection processing circuit 212 measures a positional deviation (deviation with respect to magnetic marker 10) in the vehicle-width direction of the center position (for example, the position of magnetic sensor C8) in magnetic sensor arrays 21A/B as the above-described lateral shift amount. For example, in the case of FIG. 11, the position of zero-cross Zc is a position corresponding to C9.5, which is approximately a midpoint between C9 and C10. As described above, since the space between magnetic sensors C9 and C10 is ten centimeters, the lateral shift amount with respect to magnetic marker 10 is (9.5−8)×10 centimeters with reference to C8 positioned at the center of magnetic sensor arrays 21A/B in the vehicle-width direction.

(5.2) Automatic Traveling Control

Figure 12:
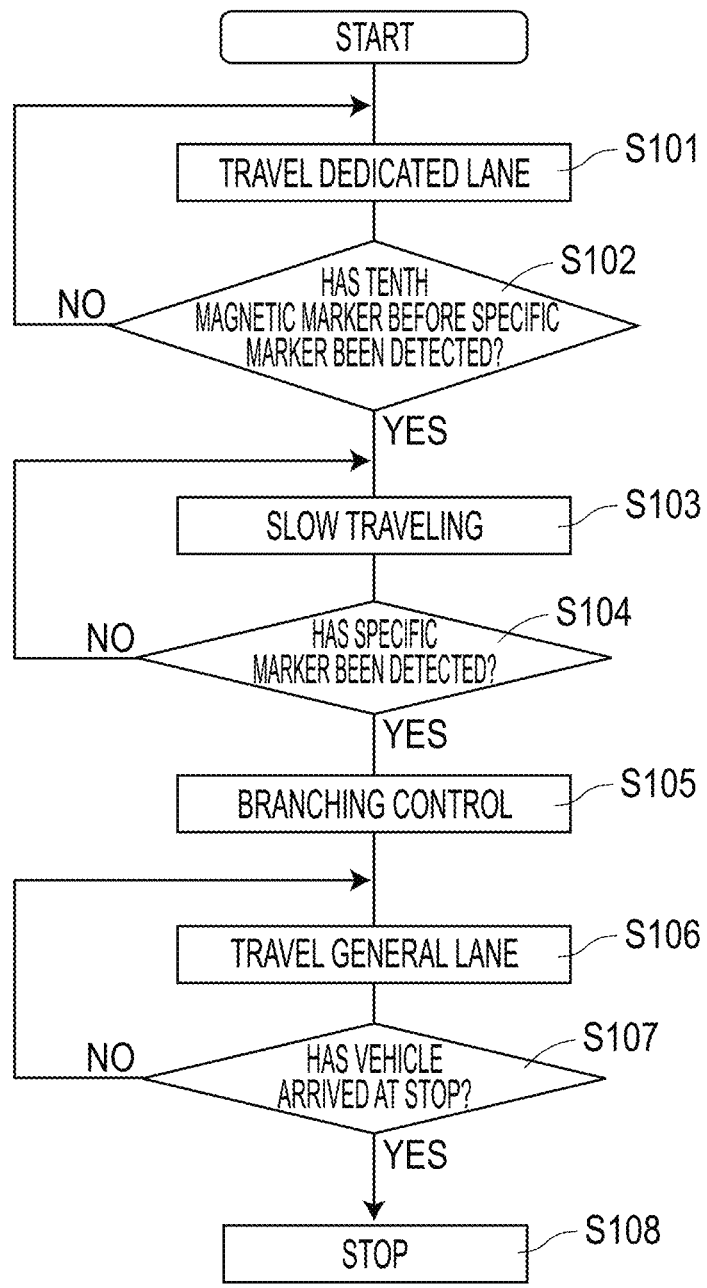
FIG. 12 is a flow diagram depicting a flow of system operation from a time when the bus branches from the dedicated lane until it arrives at a stop.
Figure 13:
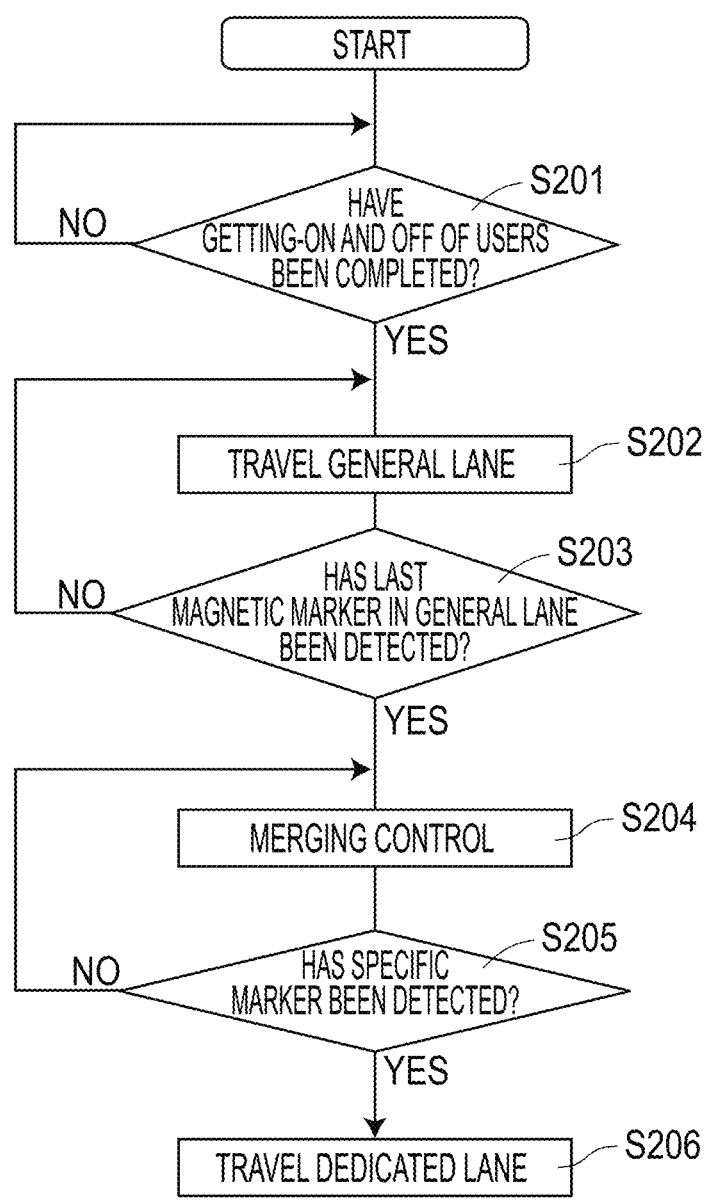
FIG. 13 is a flow diagram depicting a flow of system operation from a time when the bus departs from the stop until it merges into the dedicated lane.

Details of automatic traveling control of bus 5 are described with reference to flow diagrams of FIG. 12 and FIG. 13. FIG. 12 is a flow diagram depicting a flow of operation from a time when the bus follows a branch from dedicated lane 111 (refer to FIG. 1) to general lane 112 until it stops at stop 115. FIG. 13 is a flow diagram depicting a flow of operation from a time when the bus departs from stop 115 until it merges into dedicated lane 111. In the description below, magnetic marker 10 positioned so as to corresponding to connection point 13 for merging or branching is referred to as specific marker 10S.

(5.2.1) Operation from Branching from the Dedicated Lane Until Stopping at the Stop While traveling dedicated lane 111 (S101 in FIG. 12), bus 5 transmits the above-described vehicle status information to control server device 18 at a sufficiently fast frequency. The vehicle status information when any magnetic marker 10 is detected includes the lateral shift amounts with respect to two front and rear magnetic markers 10 detected by magnetic sensor arrays 21A/B, the tag ID of RFID tag 15 provided to front magnetic marker 10 detected by magnetic sensor array 21A, and so forth.

On receiving the vehicle status information including the lateral shift amounts and the tag ID, control server device 18 calculates control values for bus 5 to follow magnetic marker 10, and transmits the control values to bus 5 as control information. Control unit 32 of bus 5 inputs the received control information to vehicle onboard ECU 61 to cause bus 5 to automatically travel by remote control. When an obstacle on dedicated lane 111 or the like is detected by a sensor such as milli wave radar 37, for example, control information including an interrupt instruction such as emergency brake is transmitted, thereby allowing bus 5 to stop.

While bus 5 is traveling dedicated lane 111 (S101 in FIG. 12), control server device 18 refers to the storage area of connection point DB 185C. From the storage area of connection point DB 185C, control server device 18 reads the tag ID (connection point identification information) to which the attribute information for branching is linked. Then, control server device 18 refers to marker DB 185M by using the tag ID read from connection point DB 185C, and identifies specific marker 10S, which is magnetic marker 10 positioned so as to correspond to connection point 13. With this, control server device 18 identifies the position of connection point 13 for branching ahead. Also, control server device 18 refers to map DB 185T, and identifies tenth magnetic marker 10 positioned before specific marker 10S.

Control server device 18 causes bus 5 to continue to automatically travel along dedicated lane 111 (S102: NO→S101) until tenth magnetic marker 10 before specific marker 10S is detected (S102). Then, when tenth magnetic marker 10 before specific marker 10S is detected (S102: YES), control server device 18 switches the traveling state of bus 5 to slow traveling (S103).

Thereafter, control server device 18 causes slow traveling of bus 5 to continue until specific marker 10S is detected (S104: NO→S103). When specific marker 10S is detected (S104: YES), control server device 18 applies branching control to bus 5 (S105). Control server device 18 then remotely controls bus 5 so that it travels general lane 112 in accordance with the end of branching control (S106). Control server device 18 causes bus 5 to travel along general lane 112 until it arrives at stop 115 (S107: NO→S106). Thereafter, when bus arrives at stop 115 (S107: YES), control server device 18 causes bus 5 to stop at stop 115 so as to allow users to get off or get on (S108).

As described above, control server device 18 causes bus 5 to branch from dedicated lane 111 and enter general lane 112 provided with stop 115. As with the case of dedicated lane 111, control server device 18 remotely controls bus 5 so that it travels general lane 112 by following magnetic markers 10. However, in dedicated lane 111 and general lane 112, remote control mode by control server device 18 is different. For example, one difference in control between dedicated lane 111 and general lane 112 resides in control speed. As described above, compared with the control speed on dedicated lane 111, the control speed on general lane 112 is set slow. This is because there is a possibility of encountering a person, another vehicle, and so forth on general lane 112 and the bus is required to immediately stop when the possibility of contact occurs.

(5.2.2) Operation from Departing from the Stop Until Merging into the Dedicated Lane After users get on and off (S201 in FIG. 13: YES), control server device 18 causes bus 5 to start. When bus 5 is on general lane 112, control server device 18 refers to the storage area of connection point DB 185C. Then, control server device 18 reads the tag ID (connection point identification information) to which attribute information for merging is linked from the storage area of connection point DB 185C, and identifies specific marker 10S according to the tag ID. This specific marker 10S is magnetic marker 10 positioned so as to correspond to connection point 13 merging from general lane 112 to dedicated lane 111. Furthermore, among magnetic markers 10 laid on general lane 112 where the bus is traveling, control server device 18 identifies magnetic marker 10 adjacent to specific marker 10S, that is, last magnetic marker 10 before merging.

Control server device 18 remotely controls bus 5 to cause it to travel general lane 112 (S202). Thereafter when last magnetic marker 10 before merging is detected (S203: YES), control server device 18 applies merging control to bus 5 (S204). Then, when specific marker 10S positioned so as to correspond to connection point 13 merging from general lane 112 into dedicated lane 111 is detected (S205: YES), control server device 18 remotely controls bus 5 so that it can travel dedicated lane 111 (S206).

When bus 5 merges into dedicated lane 111 and another bus 5 traveling dedicated lane 111 is present, bus 5 on general lane 112 or dedicated lane 111 may be caused to reduce speed or wait at a position before connection point 13 for merging. In this case, the possibility of interference between bus merging into dedicated lane 111 and bus 5 traveling dedicated lane 111 can be avoided in advance.

(5.3) Connection Point Control

Figure 14:
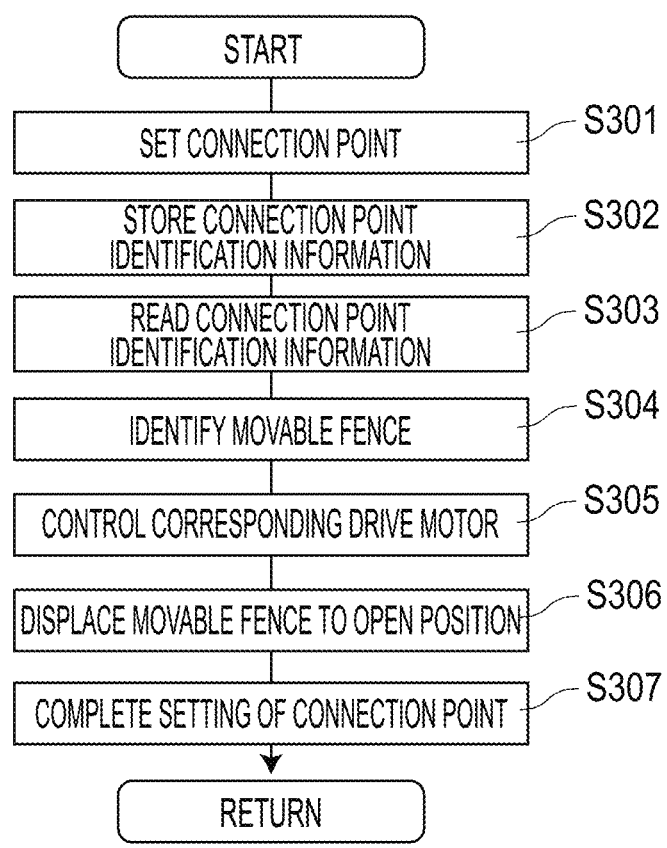
FIG. 14 is a flow diagram depicting a flow of setting a connection point.
Figure 15:
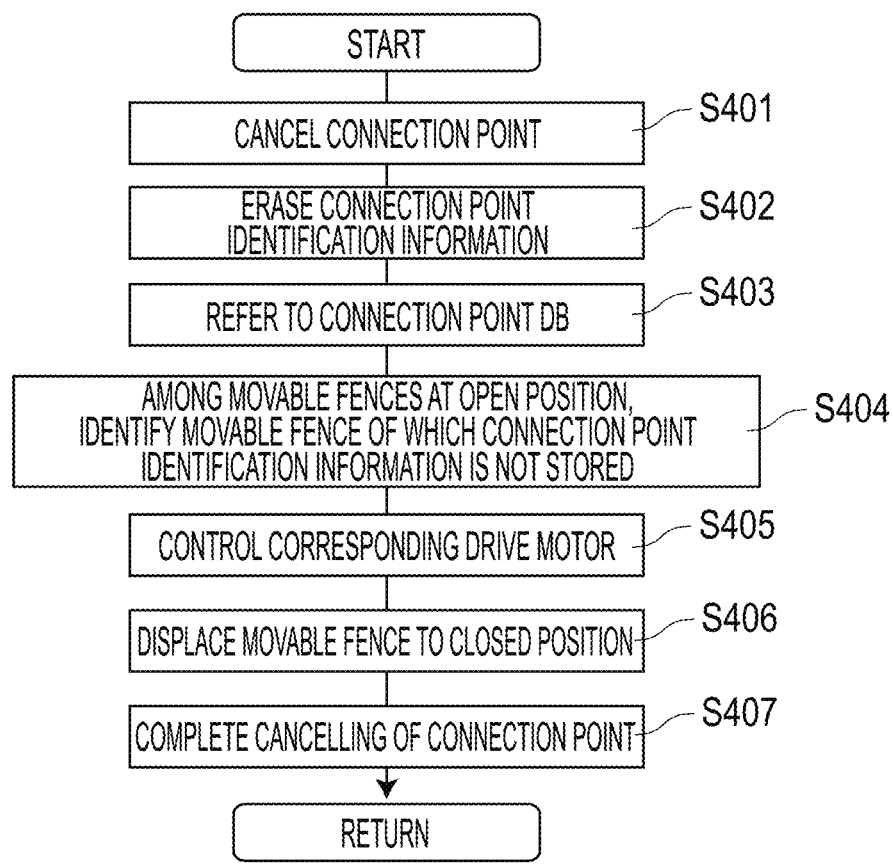
FIG. 15 is a flow diagram depicting a flow of canceling the connection point.

Flows of process of setting and canceling connection point 13 (refer to FIG. 1) are described with reference to FIG. 14 and FIG. 15. In operation system 1 of the present embodiment, connection point 13 between dedicated lane 111 and general lane 112 can be changed whenever necessary by remote control by control server device 18. When movable fence 110A is displaced to the open position, connection point 13 between dedicated lane 111 and general lane 112 is set. When movable fence 110A is transitioned from the open position to the closed position, connection point 13 between dedicated lane 111 and general lane 112 is canceled.

(5.3.1) Connection Point Setting Process

When connection point 13 is set in operation system 1 (S301), connection point identification information for identifying that connection point 13 is stored in connection point DB 185C (S302). Here, the connection point identification information of the present embodiment is a tag ID, which is identification information of magnetic marker 10 positioned so as to correspond to connection point 13.

Control server device 18 refers to the storage area of connection point DB 185C whenever necessary to read the tag ID stored as connection point identification information (S303). Then, control server device 18 identifies connection point 13 based on the read tag ID (connection point identification information), and also identifies corresponding movable fence 110A (S304).

When a fence identified as movable fence 110A corresponding to connection point 13 is not at the open position, control server device 18 controls corresponding drive motor 160 (S305) to displace movable fence 110A to the open position (S306). In operation system 1, connection point 13 is set by the process as described above (S307).

(5.3.2) Connection Point Canceling Process

When connection point 13 is canceled in operation system 1 (S401), the connection point identification information which can identify that connection point 13 is erased from connection point DB 185C (S402). The connection point identification information is the tag ID, which is identification information of magnetic marker 10 positioned so as to correspond to connection point 13.

Control server device 18 refers to the storage area of connection point DB 185C whenever necessary (S403) to identify, among movable fences 110A controlled at the open position, a fence the tag ID of which as connection point identification information is not stored (S404). Then, control server device 18 controls drive motor 160 corresponding to movable fence 110A identified at step S404 (S405) to displace that movable fence 110A from the open position to the closed position (S406). In operation system 1, connection point 13 is cancelled by the process as described above (S407).

As described above, in operation system 1 of the present embodiment, by causing the tag ID as connection point identification information to be stored in connection point DB 185C, movable fence 110A corresponding to magnetic marker 10 according to that tag ID can be displaced to the open position. Also, in operation system 1, by displacing movable fence 110A to the open position, connection point 13 can be set. Furthermore, by erasing the tag ID as connection point identification information, movable fence 110A corresponding to magnetic marker 10 according to that tag ID can be displaced from the open position to the closed position. Then, in operation system 1, with movable fence 110A displaced to the closed position, connection point 13 can be cancelled.

In operation system 1, by managing the connection point identification information stored in connection point DB 185C, connection point 13 between dedicated lane 111 and general lane 112 can be set or cancelled. For example, upon a request from a user who desires to get on or off at stop 115, the tag ID of magnetic marker 10 positioned correspondingly may be stored and registered in connection point DB 185C as connection point identification information. In this case, bus 5 can be selectively caused to head only toward stop 115 where the user desiring to get on or off waits.

In the present embodiment, operation system 1 is exemplarily described in which connection point 13 can be set to dedicated lane 111 as appropriate. In place of or in addition to connection point 13, a position where vehicle should temporarily stop and positions at the start and the end of a deceleration section may be able to be set as appropriate. As with the present embodiment, these points can also be set/cancelled by storing/erasing identification information of the corresponding magnetic marker.

In the present embodiment, general lane 112 leading to stop 115 is exemplarily described as another lane. As in FIG. 16, this another lane may be sub-lane 111S for dedicated lane 111. Stop 115 may be set in sub-lane 111S. Also, a destination in general lane 112 may be a place other than stop 115. For example, general lane 112 may simply be used as a detour. By providing general lane 112 as a detour, for example, it is possible to flexibly address, for example, a route change due to road construction work or the like, and so forth.

Figure 16:
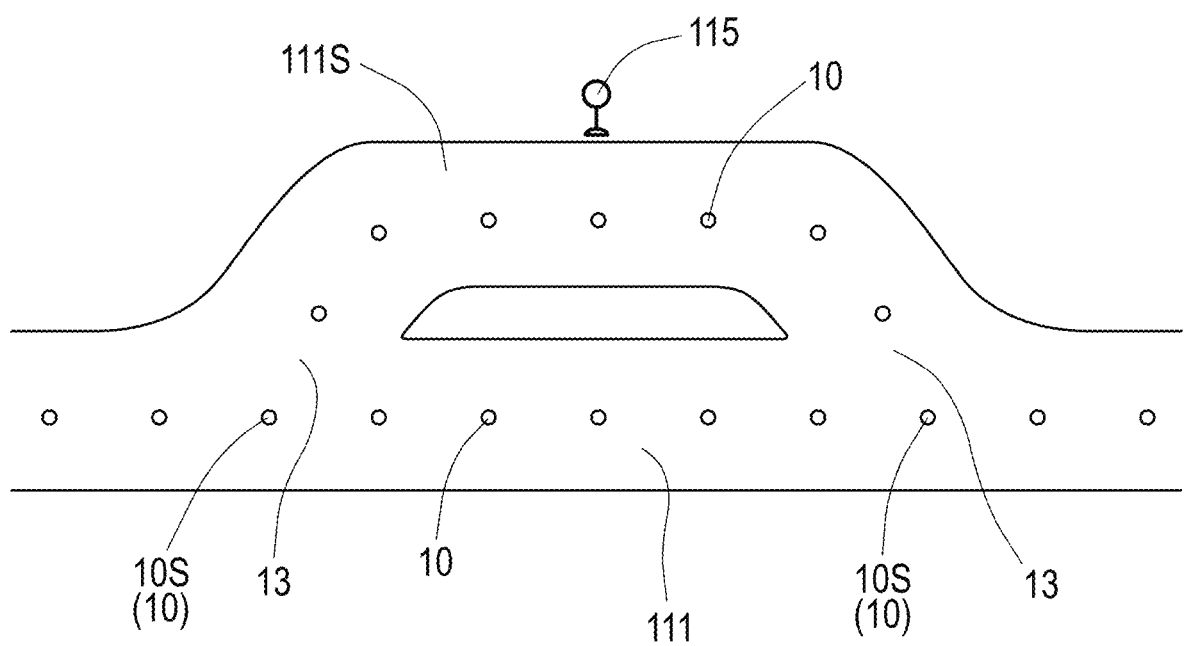
FIG. 16 is a descriptive diagram of another example of configuration of the stop.
Figure 17:
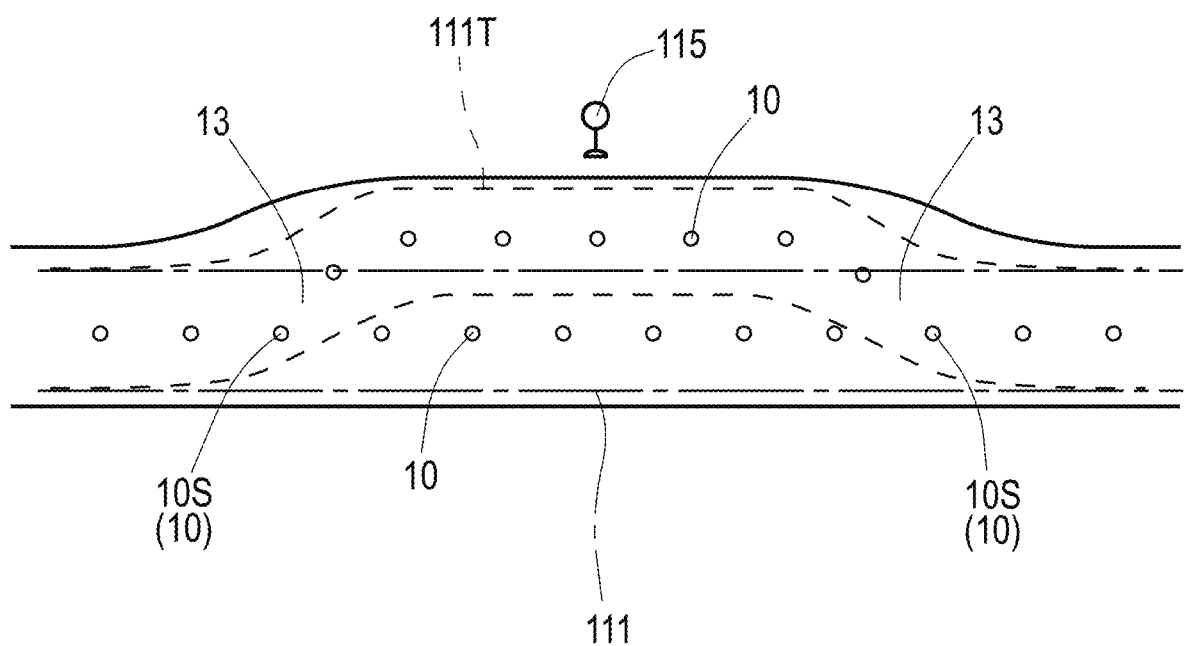
FIG. 17 is a descriptive diagram of still another example of configuration of the stop.

Based on the configuration of FIG. 16 in which a separating zone dividing dedicated lane 111 and sub-lane 111S is provided, the separating zone may be eliminated as in FIG. 17 and dedicated lane 111 and sub-lane 111S may be provided in one lane. In the configuration of the drawing, in the lane where the bus travels, the lane width of the point provided with stop 115 is widened. Also, at the point where the lane width is widened, dedicated lane 111 forming a main route of the bus passing through the stop without stopping and another lane 111T forming a sub-route of the bus to stop at the stop are provided in parallel.

Also in the present embodiment, the configuration is exemplarily described in which bus 5 automatically travels also general lane 112. However, in general lane 112, bus 5 may travel by manual operation (manually travel) by the driver. For example, when magnetic marker 10 (specific marker 10S) positioned so as to correspond to connection point 13 is detected, switching may be made between automatic traveling and manual traveling. Also in the present embodiment, the configuration is exemplarily described in which bus 5 automatically travels by remote control by control server device 18. In place of this, control unit 32 of bus 5 may calculate control values for automatic driving. In this case, bus 5 can autonomously travel.

In the present embodiment, the configuration is exemplarily described in which sheet-like RFID tag 15 is attached to the upper surface of magnetic marker 10. However, the configuration in which magnetic marker 10 and RFID tag 15 are integrated is not a requisite. It is only required that magnetic marker 10 and RFID tag 15 be arrange at the same position, and RFID tag 15 may be arranged above or below magnetic marker 10 in a vertical direction.

Magnetic marker 10 of the present embodiment is a marker integrated with RFID tag 15. In place of this, a magnetic marker not provided with RFID tag 15 may be included. For example, while magnetic marker 10 integrated with RFID tag 15 is adopted as a magnetic marker positioned so as to correspond to movable fence 110A, a magnetic marker not provided with RFID tag 15 may be adopted as another magnetic marker.

In the present embodiment, setting/cancelling connection point 13 is controlled depending on whether identification information (tag ID in the present embodiment) of magnetic marker 10 corresponding to connection point 13 is stored in connection point DB 185C as connection point identification information. When connection point 13 in a set state is cancelled, the corresponding connection point identification information is erased from connection point DB 185C. In place of this configuration, identification information of all magnetic markers 10 corresponding to positions as candidates for connection point 13 may be stored in connection point DB 185C, each as being provided with a flag. The flag is a flag indicating whether the position is set as connection point 13. In this case, of the identification information of magnetic markers 10 stored in connection point DB 185C, the identification information of magnetic marker 10 with the flag ON is connection point identification information. On the other hand, the identification information of magnetic marker 10 with the flag OFF is not connection point identification information. For example, for the identification information of magnetic marker 10 with the flag ON, switching the flag to OFF corresponds to erasing the connection point identification information. Also, for example, for the identification information of magnetic marker 10 with the flag OFF, switching the flag to ON corresponds to newly storing the connection point identification information.

In the present embodiment, as one example of magnetic marker 10 corresponding to connection point 13, magnetic marker 10 positioned so as to correspond to connection point 13 is exemplarily described. "Positioned so as to correspond to connection point 13" means that a position relation between connection point 13 and magnetic marker 10 is substantially constant and, if the position of corresponding magnetic marker 10 can be identified, the position of connection point 13 can be identified. Magnetic marker 10 corresponding to connection point 13 may be one that can identify corresponding connection point 13 when any magnetic marker 10 is identified. In the forwarding direction of bus 5, connection point 13 may be positioned downstream of corresponding magnetic marker 10, or vice versa. By referring to map DB 185T, magnetic marker 10 positioned on an upstream side with respect to corresponding magnetic marker 10 can be grasped. In accordance with detection of magnetic marker 10 positioned on the upstream side, an approach of bus 5 to connection point 13 may be recognized.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST

- 1 operation system
- 10 magnetic marker
- 11 traveling lane
- 110 fence
- 110A movable fence
- 111 dedicated lane
- 112 general lane (another lane)
- 115 stop
- 13 connection point
- 15 RFID tag (wireless tag)
- 18 control server device (setting part, movable fence control part (control part))
- 185 storage device (storage medium)
- 185M marker database (marker DB)
- 185C connection point database (connection point DB, storage part)
- 185T map database (map DB)
- 21 magnetic sensor array (magnetic detecting part)
- 212 detection processing circuit
- 32 control unit
- 34 tag reader unit
- 37 milli wave radar
- 39 forward camera
- 5 bus (vehicle)
- 61 vehicle onboard ECU

The invention claimed is:

1. An operation system for causing a vehicle to automatically travel along a dedicated lane for vehicles, the system having a plurality of magnetic markers arranged in the dedicated lane;

a storage part which stores, as connection point identification information, identification information of a magnetic marker corresponding to a connection point for at least either one of branching from the dedicated lane to another lane and merging from another lane to the dedicated lane; and a setting part which sets or cancels the connection point, wherein the storage part is configured to store, as the connection point identification information, identification information of the magnetic marker corresponding to the connection point when the connection point is set by the setting part, and erase the connection point identification information according to identification information of the magnetic marker corresponding to the connection point when the connection point is canceled by the setting part, the system is configured so that at least one of branching from the dedicated lane to another lane and merging from another lane to the dedicated lane is allowed at a point corresponding to the magnetic marker according to the connection point identification information stored in the storage part, the system has a movable fence for partitioning the dedicated lane, which can be opened and closed; and a control part which controls opening/closing operation of the movable fence, and the control part is configured to cause the movable fence corresponding to the magnetic marker according to the connection point identification information stored by the storage part to be opened and cause the movable fence corresponding to the magnetic marker according to identification information to be closed when the connection point identification information according to identification information of any of the magnetic marker is erased.

2. The operation system in claim 1, wherein the other lane includes at least a general road.

3. The operation system in claim 1, wherein the other lane includes at least a general road.

4. The operation system in claim 1, wherein the vehicle is a bus for which a stop for a user to get on or off is defined, and the other lane includes at least a lane connecting the dedicated lane and the stop.

5. The operation system in claim 4, wherein the other lane includes at least a general road.

6. The operation system in claim 1, wherein the vehicle is a bus for which a stop for a user to get on or off is defined, and the other lane includes at least a lane connecting the dedicated lane and the stop.

7. The operation system in claim 6, wherein the other lane includes at least a general road.

8. A method of controlling an operation system for causing a vehicle to automatically travel along a dedicated lane for vehicles, the operation system having:

a plurality of magnetic markers arranged in the dedicated lane;

a storage part which stores, as connection point identification information, identification information of a magnetic marker corresponding to a connection point for at least either one of branching from the dedicated lane to another lane and merging from another lane to the dedicated lane; and a setting part which sets or cancels the connection point, wherein the storage part is configured to store, as the connection point identification information, identification information of the magnetic marker corresponding to the connection point when the connection point is set by the setting part, and erase the connection point identification information according to identification information of the magnetic marker corresponding to the connection point when the connection point is canceled by the setting part, at least one of branching from the dedicated lane to another lane and merging from another lane to the dedicated lane is allowed at a point corresponding to the magnetic marker according to the connection point identification information stored in the storage part, the operation system has
- a movable fence for partitioning the dedicated lane, which can be opened and closed, and
- a control part which controls opening/closing operation of the movable fence, and the control part is configured to cause the movable fence corresponding to the magnetic marker according to the connection point identification information stored by the storage part to be opened and cause the movable fence corresponding to the magnetic marker according to identification information to be closed when the connection point identification information according to identification information of any of the magnetic marker is erased.

9. The method of controlling the operation system in claim 8, wherein
the other lane includes at least a general road.

10. The method of controlling the operation system in claim 8, wherein
the other lane includes at least a general road.

11. The method of controlling the operation system in claim 8, wherein
the vehicle is a ride-sharing bus for which a stop for a user to get on or off is defined, and
the other lane includes at least a lane connecting the dedicated lane and the stop.

12. The method of controlling the operation system in claim 11, wherein
the other lane includes at least a general road.

13. The method of controlling the operation system in claim 8, wherein
the vehicle is a ride-sharing bus for which a stop for a user to get on or off is defined, and
the other lane includes at least a lane connecting the dedicated lane and the stop.

14. The method of controlling the operation system in claim 13, wherein
the other lane includes at least a general road.

* * * * *